No. 713,100. Patented Nov. 11, 1902.
I. HOGELAND.
SELF ADJUSTING SUPPORT.
(Application filed May 21, 1901.)
(No Model.)
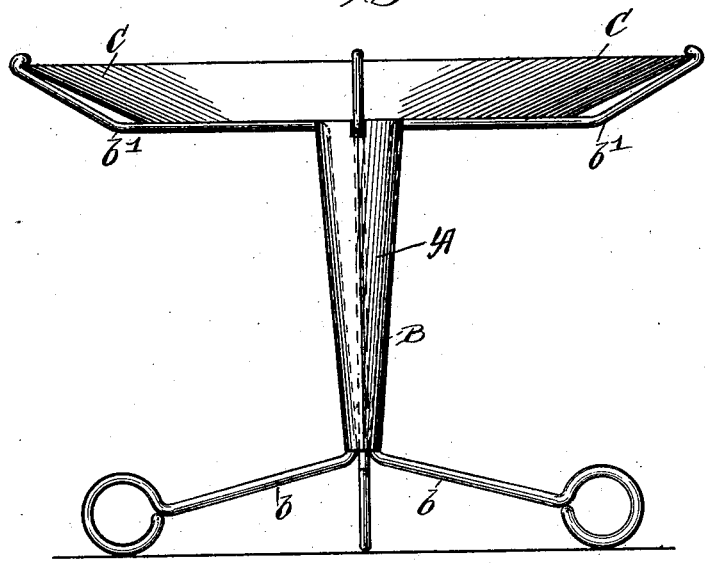
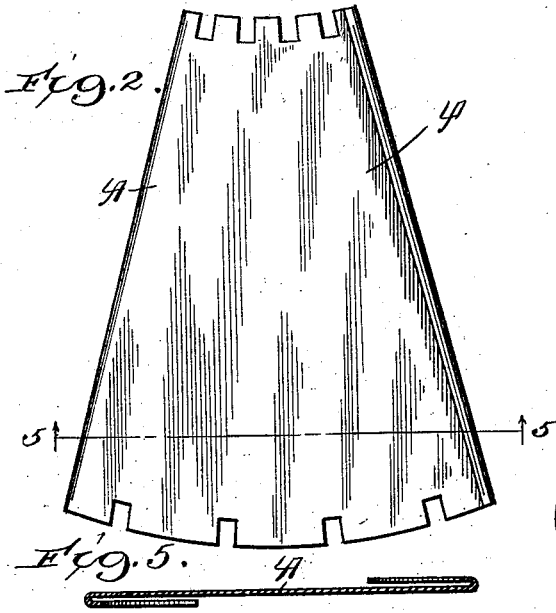
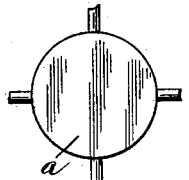
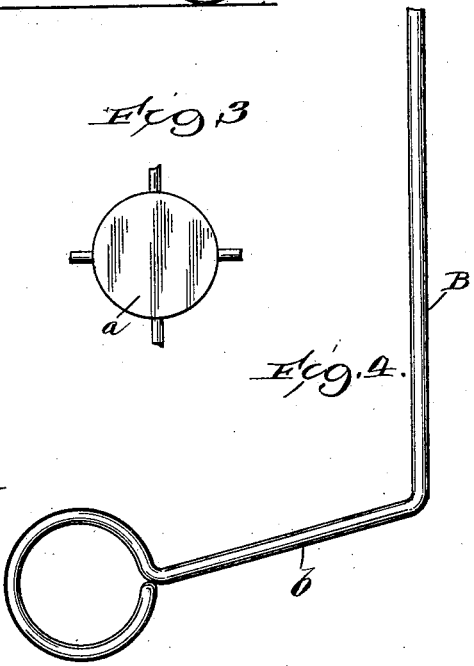
Witnesses:
Ray White
Harry B. E. White
Inventor
Israel Hogeland
By Charles W. Hill, Attorney.

UNITED STATES PATENT OFFICE.

ISRAEL HOGELAND, OF CHICAGO, ILLINOIS, ASSIGNOR TO MONRO BERNHARD, OF CHICAGO, ILLINOIS.

SELF-ADJUSTING SUPPORT.

SPECIFICATION forming part of Letters Patent No. 713,100, dated November 11, 1902.

Application filed May 21, 1901. Serial No. 61,304. (No model.)

*To all whom it may concern:*

Be it known that I, ISRAEL HOGELAND, a citizen of the United States, and a resident of Chicago, in the county of Cook and State of Illinois, have invented certain new and useful Improvements in Self-Adjusting Supports; and I do hereby declare that the following is a full, clear, and exact description thereof, reference being had to the accompanying drawings, and to the letters of reference marked thereon, which form a part of this specification.

The invention relates to a self-adjusting support, and more particularly to a support intended for display purposes.

The object of this invention is to provide an attractive, cheap, simple, and durable device designed to support a plate or other dish or receptacle, thereby forming, together with the dish, an attractive cake or fruit dish and also adapted to be used in stores or the like for the purpose of displaying china, glassware, and crockery or the like. Heretofore many different devices have been tried for the purpose specified, all of which have been expensive, many of which have been clumsy and unsightly, and therefore have not gone into general use.

The invention consists of the matters hereinafter described, and more fully pointed out and defined in the appended claims.

In the drawings, Figure 1 is a side elevation of a device embodying my invention. Fig. 2 is a plan view of the finished blank for the shell or casing. Fig. 3 is a top plan view of the finished casing with the arms broken away and the legs not shown. Fig. 4 is a fragmentary view of one of the rods or wires, forming a leg and supporting-arm. Fig. 5 is a section taken on line 5 5 of Fig. 2.

In said drawings, A indicates a blank adapted to be rolled into the conical shell or casing shown in Fig. 1. Said blank, as shown, is provided with a plurality of notches (herein shown as four in number) at each end, which when the shell or casing is complete are disposed at right angles with each other at each end of said shell.

B indicates a rod or wire bent at its lower end to form a leg $b$ and at its upper end to form the supporting-arm $b'$. Said leg portion, as shown, is provided at its extremity with a turn or loop, which presents a rounded surface for the table, shelf, or other support upon which the device may rest, thereby acting to prevent injury to varnish or finish. The supporting-arm $b'$ extends horizontally outward and near its extremity obliquely upward to its end, and at the end is provided with an inwardly-directed hook, which acts to engage the plate C or other article which it is designed to support. A plurality of such wires (herein shown as four in number) are passed upwardly through the shell or casing, which may be made of any desired length and of any desired exterior ornamentation or conformation and are secured by soldering or other suitable means at the lower or small end of said casing, as shown in Fig. 1. Four supporting-legs and four supporting-arms are thus formed, which extend outwardly and laterally of the shell or casing through the notches heretofore described. As shown, a cap $a$ is secured on the top of the casing.

The operation is as follows: The wires being secured to said casing only at the lower end thereof, when the weight of a plate or the like is applied upon said support downward pressure on the casing acts to throw the arms inwardly, thereby firmly binding the plate between and on said arms. Preferably said wires are so secured to said casing as to normally incline inwardly, thus necessitating springing the arms outwardly and placing the plate or other article in position, taking advantage of the natural resiliency of the wire to produce inward strain upon the article supported. Obviously, should the wires be pivotally secured at the lower end of the casing downward strain on the device would act to draw the arms inwardly.

The casing, as shown in the drawings, is conical. Obviously, the same on its exterior may be of any desired form, and, if preferred, some fanciful or other figure may be used, so long as space is provided in the interior to permit the arms to be spread to receive the articles to be supported. So, too, many other forms of legs or feet may be provided than those herein shown, and many features of construction may be modified without departing from the principle of my invention.

I claim as my invention—

1. The combination with a plurality of rods or wires, each bent to form a supporting-foot integral with a supporting-arm, of a casing inclosing said rods and attached thereto at its base adjacent to the supporting-feet and acting to limit the lateral movement of the arms.

2. In a device of the class described, the combination with a tapered casing, of a plurality of rods extending therethrough, each having its ends bent outwardly forming integral supporting feet and arms, the smaller end of the casing being connected with the rods and notches at each end of said casing through which said feet and arms project.

3. In a device of the class described, a casing having its interior smaller at its lower end than at its upper end, rods extending through said casing and bent to form supporting-arms adjacent to the large end of the casing, said rods being rigidly secured in the smaller end of the casing and free at the upper end thereof and notches to receive said rods at each end of the casing.

4. In a device of the class described, the combination with a conical casing, of a plurality of rods extending therethrough and attached therewith at the smaller end of the casing and each having its ends bent outwardly and forming integral supporting feet and arms and said casing having notches at each end to receive said feet and arms, and a plate closing the upper end of said casing above said rods.

In testimony whereof I have hereunto subscribed my name in the presence of two subscribing witnesses.

ISRAEL HOGELAND.

Witnesses:
C. W. HILLS,
MONRO BERNHARD.